(12) United States Patent
Reed

(10) Patent No.: US 8,923,546 B2
(45) Date of Patent: Dec. 30, 2014

(54) ASSESSMENT OF CAMERA PHONE DISTORTION FOR DIGITAL WATERMARKING

(75) Inventor: Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 321 days.

(21) Appl. No.: 13/176,242

(22) Filed: Jul. 5, 2011

(65) Prior Publication Data

US 2012/0076344 A1    Mar. 29, 2012

Related U.S. Application Data

(60) Provisional application No. 61/361,142, filed on Jul. 2, 2010.

(51) Int. Cl.
*G06K 9/00* (2006.01)
*G06T 1/00* (2006.01)

(52) U.S. Cl.
CPC .................................. *G06T 1/0028* (2013.01)
USPC ......................................... 382/100; 713/176

(58) Field of Classification Search
USPC ............ 382/100, 232; 380/54, 210, 252, 287; 713/176; 704/200.1, 273; 381/73.1; 348/460, 463
See application file for complete search history.

(56) References Cited

U.S. PATENT DOCUMENTS

| | | | |
|---|---|---|---|
| 4,345,825 A | 8/1982 | Matteson et al. | |
| 5,155,558 A | 10/1992 | Tannenbaum et al. | |
| 5,557,330 A * | 9/1996 | Astle | 348/394.1 |
| 5,862,260 A | 1/1999 | Rhoads | |
| 6,122,403 A | 9/2000 | Rhoads | |
| 6,345,104 B1 | 2/2002 | Rhoads | |
| 6,385,329 B1 * | 5/2002 | Sharma et al. | 382/100 |
| 6,408,082 B1 | 6/2002 | Rhoads et al. | |
| 6,408,331 B1 | 6/2002 | Rhoads | |
| 6,421,070 B1 | 7/2002 | Ramos | |
| 6,449,377 B1 | 9/2002 | Rhoads | |
| 6,522,769 B1 | 2/2003 | Davis | |
| 6,535,617 B1 * | 3/2003 | Hannigan et al. | 382/100 |
| 6,590,996 B1 * | 7/2003 | Reed et al. | 382/100 |
| 6,614,914 B1 | 9/2003 | Rhoads et al. | |
| 6,690,488 B1 * | 2/2004 | Reuman | 358/1.9 |
| 6,718,046 B2 | 4/2004 | Reed et al. | |

(Continued)

FOREIGN PATENT DOCUMENTS

WO    WO9953428    10/1999
WO    WO0007356    2/2000

OTHER PUBLICATIONS

U.S. Appl. No. 60/913,987, filed Apr. 25, 2007.
U.S. Appl. No. 61/357,918, filed Jun. 23, 2010.

(Continued)

*Primary Examiner* — Anand Bhatnagar
(74) *Attorney, Agent, or Firm* — Digimarc Corporation

(57) ABSTRACT

The present disclosure relates generally to cell phones and cameras, and to digital watermarking involving such cell phones and cameras. One claim recites a method comprising: measuring distortion introduced by a cell phone camera; using a programmed electronic processor, quantifying the distortion; and providing quantified distortion as feedback to adjust a digital watermark embedding process in view of the distortion introduced by the cell phone camera. The act of quantifying distortion may include, e.g., quantifying a spatial frequency response (SFR) of the cell phone camera. Of course, other claims and combinations are provided too.

8 Claims, 12 Drawing Sheets

(56) References Cited

U.S. PATENT DOCUMENTS

| | | | |
|---|---|---|---|
| 6,718,047 B2 * | 4/2004 | Rhoads | 382/100 |
| 6,763,123 B2 | 7/2004 | Reed et al. | |
| 6,891,959 B2 | 5/2005 | Reed et al. | |
| 6,912,295 B2 | 6/2005 | Reed et al. | |
| 6,947,571 B1 | 9/2005 | Rhoads et al. | |
| 7,020,304 B2 | 3/2006 | Alattar et al. | |
| 7,072,487 B2 | 7/2006 | Reed | |
| 7,181,074 B2 * | 2/2007 | Okada et al. | 382/240 |
| 7,289,643 B2 | 10/2007 | Brunk et al. | |
| 7,365,838 B2 | 4/2008 | Jones | |
| 7,486,827 B2 | 2/2009 | Kim | |
| 7,751,645 B2 | 7/2010 | Reneker et al. | |
| 7,911,501 B2 | 3/2011 | Johnson et al. | |
| 7,930,546 B2 | 4/2011 | Rhoads et al. | |
| 8,068,163 B2 | 11/2011 | Johnson et al. | |
| 8,111,937 B2 | 2/2012 | Dowski, Jr. et al. | |
| 8,280,098 B2 * | 10/2012 | Yadid-Pecht et al. | 382/100 |
| 8,401,224 B2 * | 3/2013 | Rhoads | 382/100 |
| 8,599,301 B2 | 12/2013 | Dowski, Jr. et al. | |
| 2002/0044659 A1 | 4/2002 | Ohta | |
| 2004/0001608 A1 * | 1/2004 | Rhoads | 382/100 |
| 2004/0250078 A1 * | 12/2004 | Stach et al. | 713/176 |
| 2007/0253594 A1 | 11/2007 | Lu | |
| 2008/0174570 A1 | 7/2008 | Jobs et al. | |
| 2008/0298632 A1 | 12/2008 | Reed | |
| 2008/0317278 A1 | 12/2008 | Lefebvre | |
| 2009/0232352 A1 * | 9/2009 | Carr et al. | 382/100 |
| 2010/0150396 A1 | 6/2010 | Reed | |
| 2010/0150434 A1 | 6/2010 | Reed | |

OTHER PUBLICATIONS

U.S. Appl. No. 13/165,564, filed Jun. 21, 2011.

Yellott et al., "Correcting spurious resolution in defocused images," SPIE 6492, pp. 64920O-1-64920O-12 (2007).

Alattar et al., "Smart Images Using Digimarc's Watermarking Technology," SPIE, San Jose, CA (2000).

Lock et al., "Application of spatial frequency response as a criterion for evaluating thermal imaging camera performance," Proc. of SPIE vol. 6941 (2008).

* cited by examiner

ASSESSMENT OF CAMERA PHONE DISTORTION FOR DIGITAL WATERMARKING

RELATED APPLICATION DATA

This application claims the benefit of U.S. Patent Application No. 61/361,142, filed Jul. 2, 2010, which is hereby incorporated by reference in its entirety.

TECHNICAL FIELD

The present disclosure relates generally to cell phones and cameras, and relates to using such cell phones and cameras to facilitate digital watermark embedding and detection, and signal processing analysis.

BACKGROUND AND SUMMARY

The term "steganography" generally infers data hiding. One form of data hiding includes digital watermarking. Digital watermarking may include a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process may then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

Example work in steganography, data hiding, digital watermarking and signal detection is reflected, e.g., in U.S. Pat. Nos. 7,072,487; 6,947,571; 6,912,295; 6,891,959; 6,763,123; 6,718,046; 6,614,914; 6,590,996; 6,522,769; 6,408,082; 6,122,403 and 5,862,260, and in published specifications WO 9953428 and WO 0007356 (corresponding to U.S. Pat. Nos. 6,449,377 and 6,345,104), and in published U.S. Patent Application No. US 2008-0298632 A1. Each of the patent documents mentioned in this paragraph is hereby incorporated by reference in its entirety. Of course, a great many other approaches are familiar to those skilled in the art. The artisan is presumed to be familiar with a full range of literature concerning steganography, data hiding and digital watermarking.

A so-called "fingerprint" may include characteristic features used to identify a video or image. Such characteristic features can be derived, calculated or extracted from an image or video itself. Some such characteristic features may include, e.g., frequency domain features, peaks, power characterizations, amplitude values, statistical features, key frame analysis, color, motion changes during a video sequence, and/or others. Characteristic features (e.g., one or more fingerprints) of artwork, or a portion thereof, can be distilled into a set of numbers, or features, which can be stored in a database, and later matched against unknown works to identify the same. A fingerprint also can be used to link to or access remote data. Example image and video fingerprinting techniques are detailed, e.g., in patent publications U.S. Pat. Nos. 7,930,546, 7,289,643, and 7,020,304 (Digimarc); U.S. Pat. No. 7,486,827 (Seiko-Epson); 20070253594 (Vobile); 20080317278 (Thomson); and 20020044659 (NEC). Each of the above patent documents is hereby incorporated by reference in its entirety.

Portions of this disclosure describe a watermark robustness method and system based on a mobile cell phone camera's spatial frequency response and watermark embedding parameters such as density and strength. A watermark robustness metric is provided to help improve watermark embedding, e.g., when know the type of imaging system that will likely optically capture the watermarked object for detection. In one example, the robustness metric may be computed by measuring the area under the spatial frequency response for the range of frequencies covered by a watermark synchronization signal while excluding the interference due to aliasing. By measuring the distortion introduced by a particular camera, the impact on watermark detection can be understood and quantified without having to conduct large-scale experiments. This in turn can provide feedback on adjusting watermark embedding parameters and finding a trade-off between watermark visibility and robustness to distortion. In addition, new cell phone devices can be quickly qualified for their use in smart image applications.

One possible combination of the present disclosure includes a method comprising: measuring distortion introduced by a cell phone camera; using a programmed electronic processor, quantifying the distortion; and providing quantified distortion as feedback to adjust a digital watermark embedding process in view of the distortion introduced by the cell phone camera.

Another combination includes a method comprising: determining a first metric associated with a first cell phone camera; determining a second metric associated with a second cell phone camera using a programmed electronic processor, and based on the first metric and the second metric, determining watermark embedding parameters for a watermark embedder.

Still another combination includes a method comprising: measuring a spatial frequency response (SFR) of a cell phone camera; and using a programmed electronic processor, estimating image quality distortion due to the cell phone camera based on a result of the act of measuring.

Further combinations, aspects, features and advantages will become even more apparent with reference to the following detailed description and accompanying drawing.

BRIEF DESCRIPTION OF THE DRAWINGS

Each of the following figures is included in the specification of this patent application.

FIG. 9a shows the SFR of iPhone 3G and iPhone 3GS; and FIG. 9b shows the SFR of iPhone 3G and iPhone 4.

FIG. 10a shows a comparison between iPhone 3G and iPhone 3GS; and FIG. 10b shows a comparison between iPhone 3G and iPhone 4.

FIG. 15a shows iPhone 3GS, WPI 66, Gaussian noise=20%; FIG. 15b shows iPhone 3GS, WPI 66, Gaussian noise=40%; FIG. 15c shows iPhone 4, WPI 66, Gaussian noise=20%; FIG. 15d shows iPhone 4, WPI 66, Gaussian noise=40%.

FIG. 16a shows watermark robustness results; and FIG. 16b shows a SFR-robustness metric.

DETAILED DESCRIPTION

A number of applications of digital watermarking technology can be applied and utilized with smart mobile devices (e.g., cell phones). Today's cell phones are characterized by increased computational capabilities and better sensors including cameras.

Figure 1:
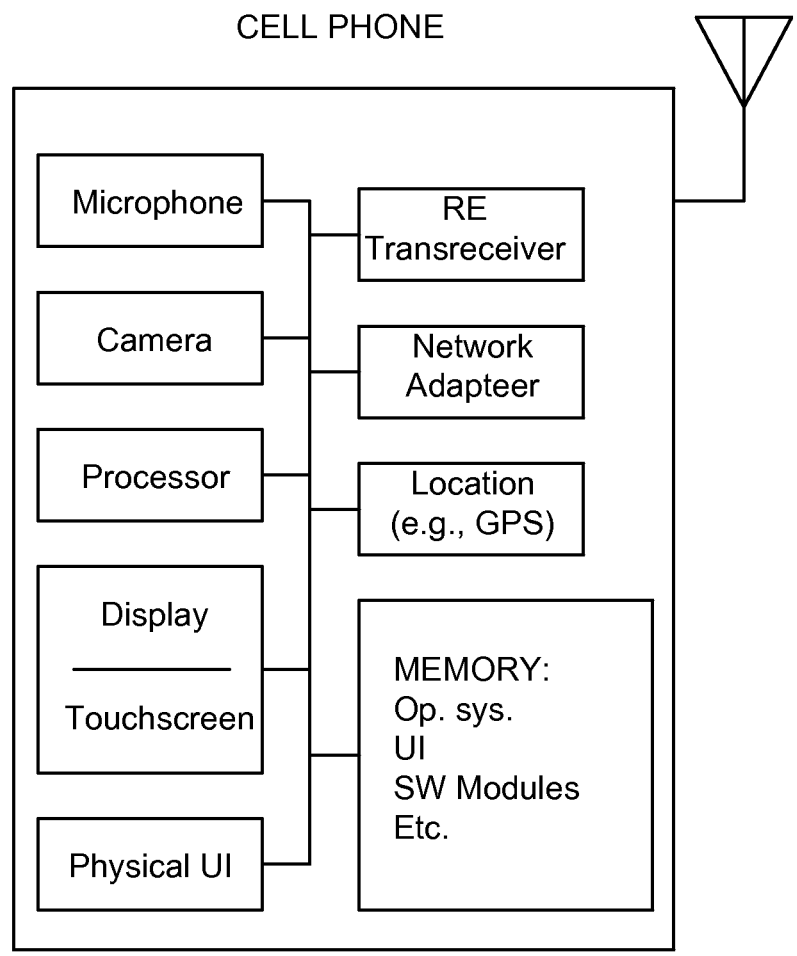
FIG. 1 is a block diagram illustrating an exemplary cell phone.

FIG. 1 shows an exemplary cell phone, including, e.g., elements such as a microphone, a camera, a processor, a display/touchscreen, a physical user interface, a RF transceiver, location module (e.g., GPS), network adaptor and memory. The memory may store operating system software, user interface software, signal detector software, other functional software modules, etc. Of course, cell phones including more or less features will also benefit from the present disclosure. Some examples of cell phones include Apple's iPhone (e.g., 3G, 3GS and iPhone 4 models).

Some applications of digital watermarking involve the use of smart images. Smart images are discussed in Alattar et al., "Smart Images Using Digimarc's Watermarking Technology," SPIE, San Jose, Calif. (2000). A smart image may include a digital or analog image containing a digital watermark. Successful detection of a watermark from an image leads to additional information (including multimedia content) via the internet. For example, a watermark may include or link to a message, link (e.g., URL) or index which can be used to establish communication with a remotely located network resource. Related disclosures are found in U.S. Pat. Nos. 6,947,571; 6,421,070; and 6,408,331. Each of the patent documents mentioned in this paragraph is hereby incorporated by reference in its entirety. Smart images can be used with mobile camera cell phones and this can facilitate a link between physical media such as printed images and digital multimedia content.

So-called "chrominance watermarking" facilitates imperceptible watermarking of images at lower spatial frequencies, e.g., by watermarking in chrominance channels. Favorable robustness vs. imperceptibility can be achieved with chrominance embedding vs. luminance based embedding. Chrominance watermarking is therefore well suited for smart phone applications using watermarking.

For a CMYK color image, a chrominance watermark signal may be embedded in both the red/green and blue/yellow orthogonal directions. Prior to embedding, the watermark signal may be scaled by a strength factor determined by the visibility and robustness trade-off. Other examples of chrominance watermarking can be found in U.S. Patent Application Nos. US 2010-0150434 A1 and US 2010-0150396 A1; and in U.S. application Ser. No. 13/165,564. Each of the patent documents mentioned in this paragraph is hereby incorporated by reference in its entirety.

As mentioned above, a digital watermark may include two or more components (or, interchangeably, "signals"). For example, a watermark may include a message signal and synchronization signal. In some cases the synchronization signal includes a set of impulse functions in a transform domain, like a Fourier magnitude domain, e.g., each with a pseudorandom phase. In other cases, the synchronization signal may include a set of spikes or peaks of frequencies. In some examples the message signal includes a spread spectrum message. U.S. Pat. No. 6,614,914 discusses watermark embedding and detection, including a discussion of watermark components. The '914 patent is hereby incorporated by reference in its entirety.

Generally speaking, in chrominance watermarking using two components—a message component and a synchronization component—the synchronization component plays a more dominant role in influencing both watermark visibility and robustness to distortion. The synchronization signal helps facilitate reading the watermark message after printing over a wide range of scale and angles. Both signals can be embedded as repeating blocks so that they are robust to cropping as well as rotation and scale. The synchronization signal can be a template that is used to realign the image into the original rotation, scale, and shift values. The payload can be, e.g., coded in binary using error correction and convolutional codes to improve robustness against random noise and difficult image content. The coded payload may also be, e.g., combined (e.g., XOR'd) with a random sequence to whiten the signal and embedded into the image redundantly within each block using chrominance variations.

Prior to embedding in a host signal, a watermark signal may be scaled by a strength factor determined by the visibility and robustness trade-off. Of the two component signals of chrominance watermarking—message and synchronization signals—the synchronization signal may play a more dominant role in influencing both watermark visibility and robustness to distortion. The synchronization signal allows the watermark to be read after printing over a wide range of scale and angle. Detection of the synchronization signal is helpful for decoding the message signal.

The relatively low resolution and noise levels of typical mobile cell phone cameras impose constraints on visibility and watermark robustness trade-off. Due to the relatively low sensitivity of human visual system (HVS) to chrominance changes, a low resolution chrominance watermark results in high image fidelity while providing good robustness for mobile applications.

The distortion introduced by typical camera phones such as iPhone 3G and iPhone 3GS can be measured and quantified. For example, the spatial frequency response (SFR) of a mobile camera phone can be measured. A robustness metric that relates camera phone quality to watermark robustness can be used to adjust a watermarking embedding process. One advantage of defining a robustness metric based on camera quality distortion is that it enables fast and effective modeling of watermark detector performance for a wide range of mobile phones. This is helpful because a watermarked printed image may have to be read by a wide range of smart phones available to consumers. By simulating watermark detector behavior for a range of mobile devices, feedback can be provided to a chrominance watermark embedding process. Use of robustness models save time and costs by reducing the need for several watermarked print runs before finding the optimal balance between watermark visibility and robustness to distortion.

For printed images, watermark bits do not necessarily need to map one-to-one onto the pixels of an image. This may be because the pixel density of printed images can be highly variable—some may be printed at 300 dots per inch (DPI), others at 600 dpi and so on. Hence, for watermarking, the number of watermark bits per inch (WPI)—a watermark density value—may be a factor influencing both visibility and robustness. Typically, higher WPI results in improved visibility. In smart cell phone applications, limitations of a camera's resolution and focal length may result in a reduction of watermark robustness for higher WPI.

Figure 8:
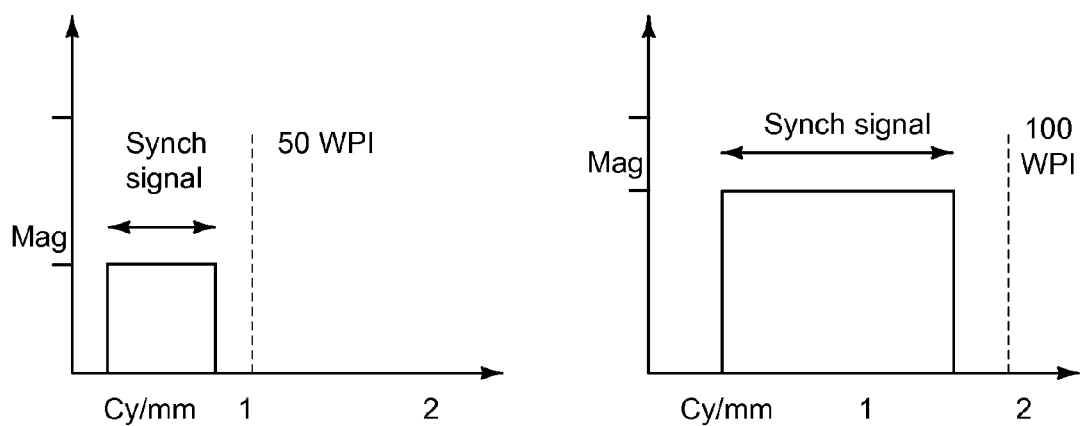
FIG. 8 is a diagram showing an example of a synchronization signal and embedding of such.

By way of example, magazine images can be printed with a half tone screen resolution of, e.g., 150 to 200 lines per inch (LPI). A 150 LPI half tone screen is typically generated from a CMYK color image of twice the resolution or 300 pixels per inch (PPI). Each pixel (or a subset of such pixels) in a 300 PPI image can be modulated to carry a watermark, so that the highest watermark resolution that can be inserted is 300 WPI. By repeating a watermark cell, the maximum WPI can be reduced to allow the watermark to be read by a low resolution mobile capture device, but at the expense of increased visibility. Similarly, higher watermark strength linearly increases the magnitude of the watermark modulation but at the expense of increased visibility. A reasonable trade-off when using streaming is to use watermarks in the range from 50-100 WPI. The spatial frequencies spanned by the synchronization signal range from ¼th to ¾th of the spatial frequency corresponding to the given WPI (see FIG. 8). As shown in FIG. 8, an example watermark synchronization signal of higher strength can be embedded at a higher WPI of 100 in order to obtain the same visibility as a weaker synchronization signal at 50 WPI. Location of the synchronization signal can be determined by the WPI. For a given WPI, a synchronization signal can be, e.g., embedded within 25% to 75% of the spatial frequency corresponding to the WPI (dotted line in FIG. 8).

For mobile cell phone applications using digital watermarking, one or more of the following may influence watermark robustness of chrominance watermarking in printed images.

Watermark pixel density
Content of the image
Print quality
Camera capabilities of a mobile phone The watermark pixel density and resolution affects both visibility and watermark robustness. Further, a camera's resolution and focal length may impose constraints on the watermark pixel density or WPI that can be effectively captured prior to watermark detection.

Watermark pixel density and camera distortion are used for defining the robustness metric below. In one example, a mobile cell phone camera is pointed at the 'smart image' and the watermark is detected over a distance ranging from 2 to 6 inches, provided that the camera is within about +/−10 degrees of normal to the printed material.

Test procedures for the measurement of the quality of images produced by digital cameras are well established. However, standardized test methods for the evaluation of camera phones are still lacking. The recently established camera phone image quality (CPIQ) initiative by the International Imaging Industry Association (I3A) aims to develop standards for evaluating camera phone image quality. Some of the main attributes of image quality include resolution, sharpness, noise, and color reproduction.

Some of the image quality metrics for assessing the image quality attributes include spatial frequency response (SFR), color uniformity, noise power spectrum, spatial and geometric distortion, opto-electronic conversion function, and lateral chromatic aberration. Among these metrics, the SFR and noise measurements may be of more significance to chrominance watermarking. This may be because watermark embedding involves, at least in part, the spatial frequency content of an input image. Hence, a camera phone characterized by good SFR in the range of spatial frequencies spanned by a watermark synchronization signal usually results in better watermark detection compared to one which does not. Although, chrominance watermarking involves embedding in the red/green and blue/yellow planes of a CMYK color image, measurement of chromatic aberration is not necessary for the assessment of watermark robustness. This may be due to the fact that watermark embedding does not necessarily involve weighting the watermark signal in accordance with the color content of an image.

Watermark detection can be influenced by the information conveyed by SFR. Hence, in one example, a mobile phone image quality metric for watermark robustness assessment involves the SFR. SFR may include a method to gauge contrast loss of a device when it captures varying frequency content of a scene. An SFR curve may represent relative efficiency of a camera in terms of capturing the contrast from print to digital image. The work using slanted-edge SFR measurement implemented by the MITRE SFR Edge (v.5) software can be useful when considering SFR. Alternative measurements, such as the sine-wave SFR (S-SFR) may also be useful.

Figure 2:
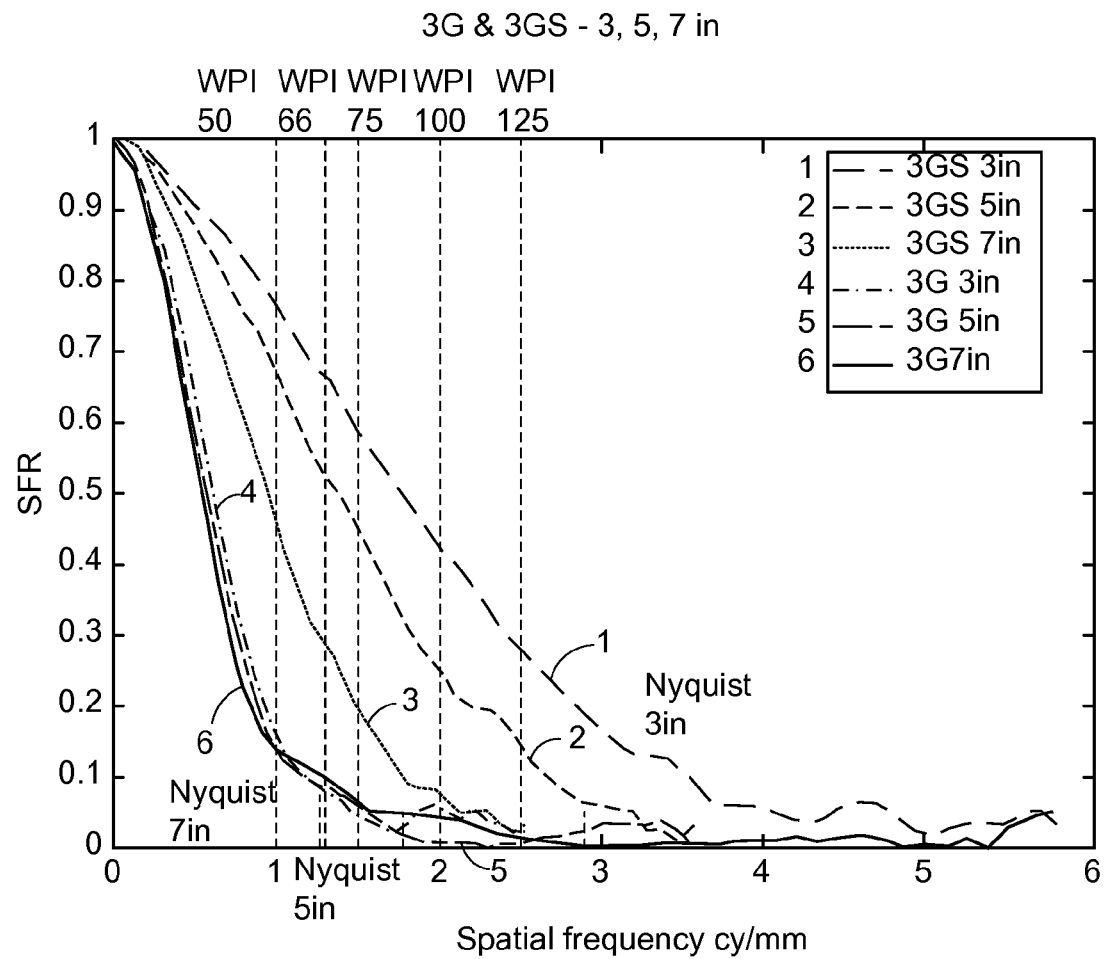
FIG. 2 is a diagram showing SFR measurements for iPhone 3G and iPhone 3GS cameras at target distances of 3, 5, and 7 inches.

An ISO2233 test chart can also be used for slanted-edge SFR measurement. For example, an automated process can be used to capture relatively low-resolution preview images of a slanted edge target image (e.g., ISO2233 test chart) by positioning iPhones at a specified distances. The SFR measurements for iPhone 3G, iPhone 3GS and iPhone 4 cameras at target distances of 3, 5, and 7 inches were obtained as shown in FIG. 2A. The images were captured under two different lighting conditions which included cool white fluorescent light at a high intensity of about 260 lux and a low intensity of about 50 lux. An example mobile phone application including a digital watermark detector may involve the capture of preview frames from the camera phone's video mode rather than taking higher-resolution photos of the target. This may be helpful because preview frames are quick to capture and provide a desired user experience (e.g., quicker response time). In FIG. 2, the SFR characteristics of iPhone 3GS are indicated by dotted lines and SFR curves of iPhone 3G are indicated by solid lines. The SFR of iPhone 3GS is better than that of iPhone 3G at all distances. Due to the fixed focal length of iPhone 3G, the SFR response does not deteriorate rapidly as a function of distance. The SFR curves of the individual red, green and blue channels are usually within a narrow margin around the curve for luminance SFR. Hence, in the FIG. 2 example, only the luminance channel is used for representing the SFR of a particular capture device.

Nyquist frequencies of the image captured at different distances are shown above. The Nyquist frequency is determined by the resolution of preview capture at a given distance. For example, preview frames captured at a distance of 3 inches were measured to have a resolution of 146 pixels per inch (ppi), preview frames captured at 5 inches had a resolution of 90 ppi, and preview frames at 7 inches had a resolution of 64 ppi. Image content including spatial frequencies above the sampling frequency can be aliased in accordance with a scaling factor determined by the SFR. The aliased content interferes with the image content at lower spatial frequencies. The vertical dashed lines in FIG. 2 show various WPI options available during the watermark embedding process. For example, 100 WPI corresponds to 50 cycles per inch or 2 cycles per mm. For a printed image watermarked at a resolution of 100 WPI, the synchronization signal is present in the spatial frequencies ranging from 25 WPI to 75 WPI. Hence, by projecting the WPI onto the SFR characteristics, the SFR of a capture device can be obtained for the spatial frequencies spanned by the synchronization signal.

SFR-Based Watermark Robustness Metric

The SFR as a function of spatial frequency can provide a good measure of the image quality distortion due to the camera. By including the spatial frequency corresponding to a particular WPI, the impact of camera distortion on, e.g., a watermark synchronization signal can be determined. A measure of watermark robustness based on the SFR can be derived by computing the area under the SFR curve for the range of spatial frequencies in which the synchronization signal exists and subtracting the area under the SFR curve due to aliasing. The SFR-based robustness metric $\lambda$ at a given target distance can be obtained as follows.

$$\lambda = \rho_{synch} - \rho_{alias} \quad (1)$$

where $\rho_{synch}$ is the area under the SFR curve in the region of the synchronization signal and $\rho_{alias}$ is the area under the SFR curve due to spatial frequencies aliasing with the synchronization signal. The area under the SFR curve can be computed, e.g., using the trapezoidal rule over small intervals of spatial frequencies. This information can be feed back to a watermark embedder to change embedding parameters. For example, a particular WPI can be selected, or watermark embedding strength can be adjusted in anticipation of likely distortion (e.g., from one or more cell phones likely to capture a watermarked image).

Figure 3:
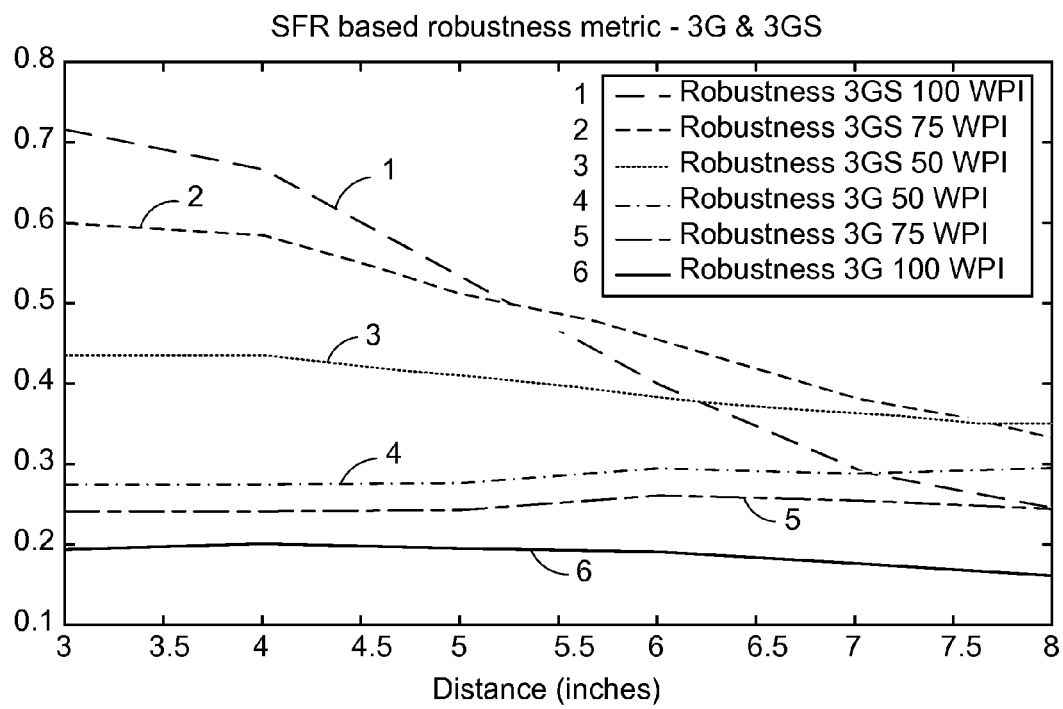
FIG. 3 is a diagram showing SFR-based robustness metric for iPhone 3G and iPhone 3GS cell phone.

In some examples, the SFR-based robustness metric was computed for iPhone 3G and iPhone 3GS for different WPI values at target distances ranging from 3 to 8 inches (see FIG. 3). As shown in FIG. 3, the watermark decoding performance for images captured by the iPhone 3GS is better than that for iPhone 3G for all WPI and for all target distances below 7 inches. In general, similar detector behavior was observed when looking at watermark detection using iPhone 3G and iPhone 3GS as capture devices for real watermarked printed images. The some of the following section discuss the relationship between SFR-based watermark robustness and actual watermark detector behavior for iPhone 3GS.

Figure 10A:
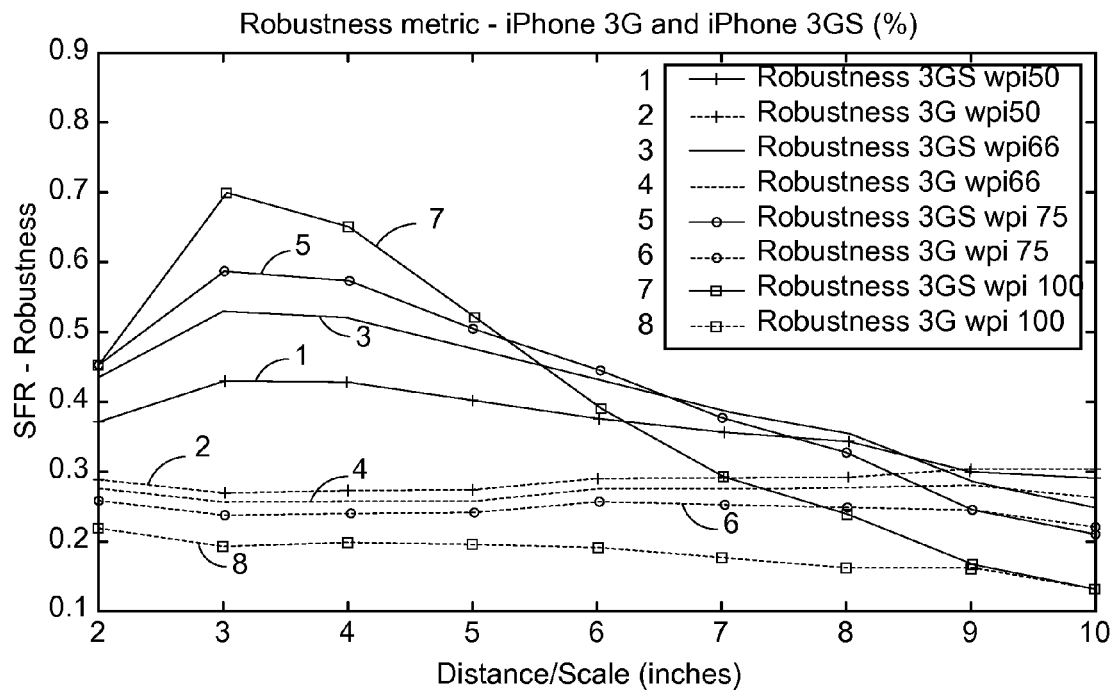
FIGS. 10a and 10b show SFR-based robustness metrics. In particular.
Figure 10B:
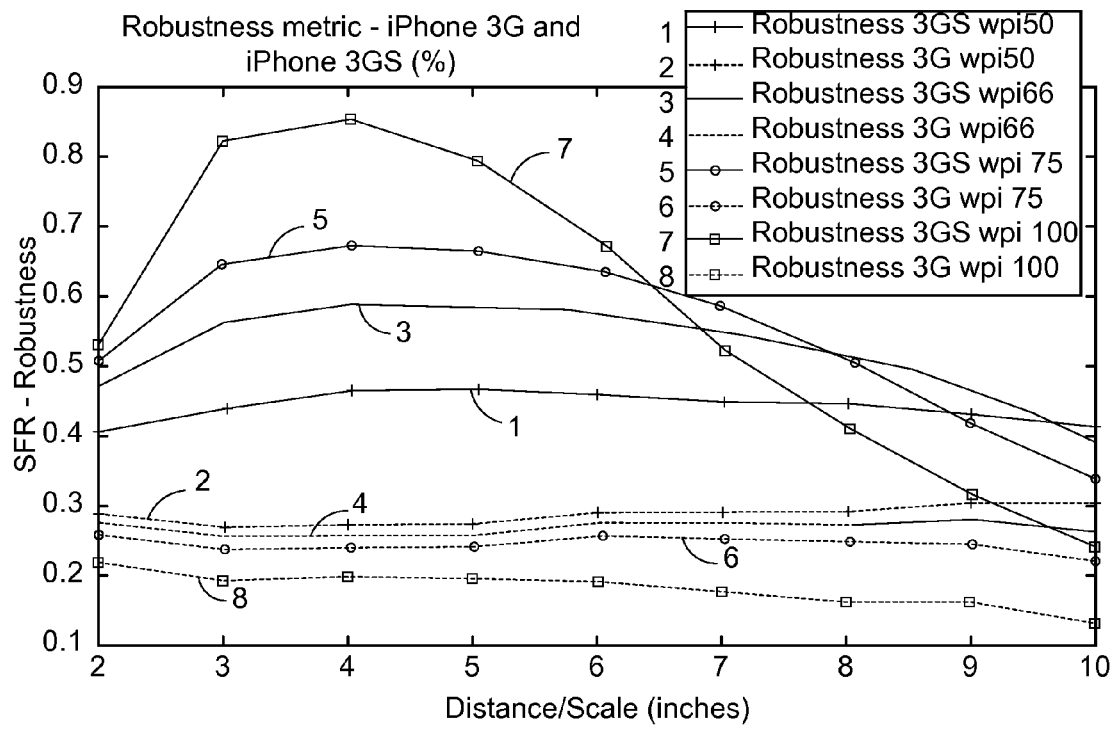

In other examples, the SFR-based robustness metric was computed for iPhone 3G, iPhone 3GS and iPhone 4 for different WPI values at target distances ranging from 2 to 10 inches (see FIGS. 10a and 10b). In these figures, the watermark decoding performance for images captured by iPhone 3GS and iPhone 4 are better than that for iPhone 3G for all WPI and for all target distances below 9 inches. The SFR-robustness metric also predicts a much better watermark robustness for iPhone 4 in comparison to iPhone 3GS for most scale values. In general, similar watermark detector behavior was observed when large-scale experiments were conducted using iPhone 3G, iPhone 3GS and iPhone 4 as capture devices for real watermarked printed images.

SFR-Based Robustness and Watermark Detector Performance

In order to verify the accuracy of the robustness model based on the SFR-robustness metric, several experiments were conducted using actual smart images. For the experiments discussed in this section, a set of 4 newsprint images with diverse content was used. The images were watermarked with different watermark strength values (3 and 4) and WPI (75 and 100) resulting in multiple sets of watermarked images. Both values (3 and 4) result in an imperceptible watermark. A value of 6, for example, would yield a "graininess" or noise-like signal that would be marginally perceptible. Chrominance watermarking was used in these figures. The iPhone 3GS was used to capture preview frames of each watermarked image over a range of distances of 3 inches to 7 inches in the presence of cool white fluorescent illumination at a light level of about 50 lux. The light level was selected to approximate the lowest value in common use in an office or home environment. For each of the 4 prints a set of 35 preview images were captured at each position, separated by 0.3 inches from 2.9 inches to 7.1 inches. The captured images were then input to a corresponding watermark detector. At each point on the actual watermark robustness curve (for example, see FIG. 4) represents the average of 280 image captures. The captures were degraded by Gaussian noise with a standard deviation of 20% before watermark detection to avoid saturation of the robustness at low distances.

Figure 4:
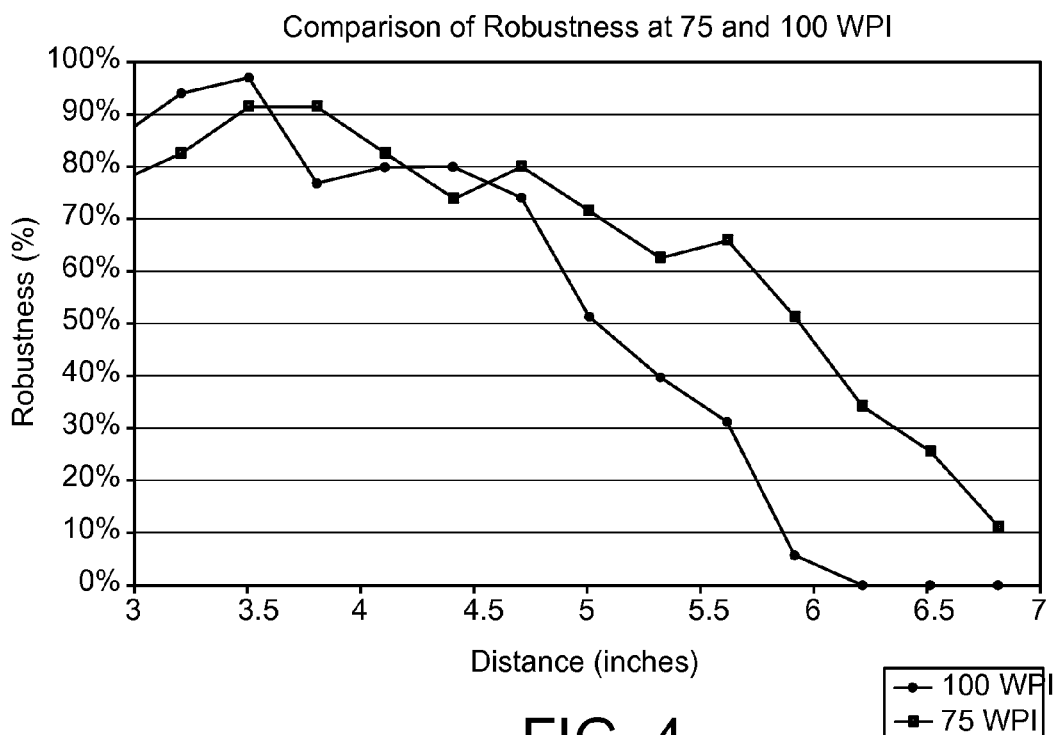
FIG. 4 is a diagram showing average watermark robustness for WPI 75 and 100 as a function of distance.
Figure 5:
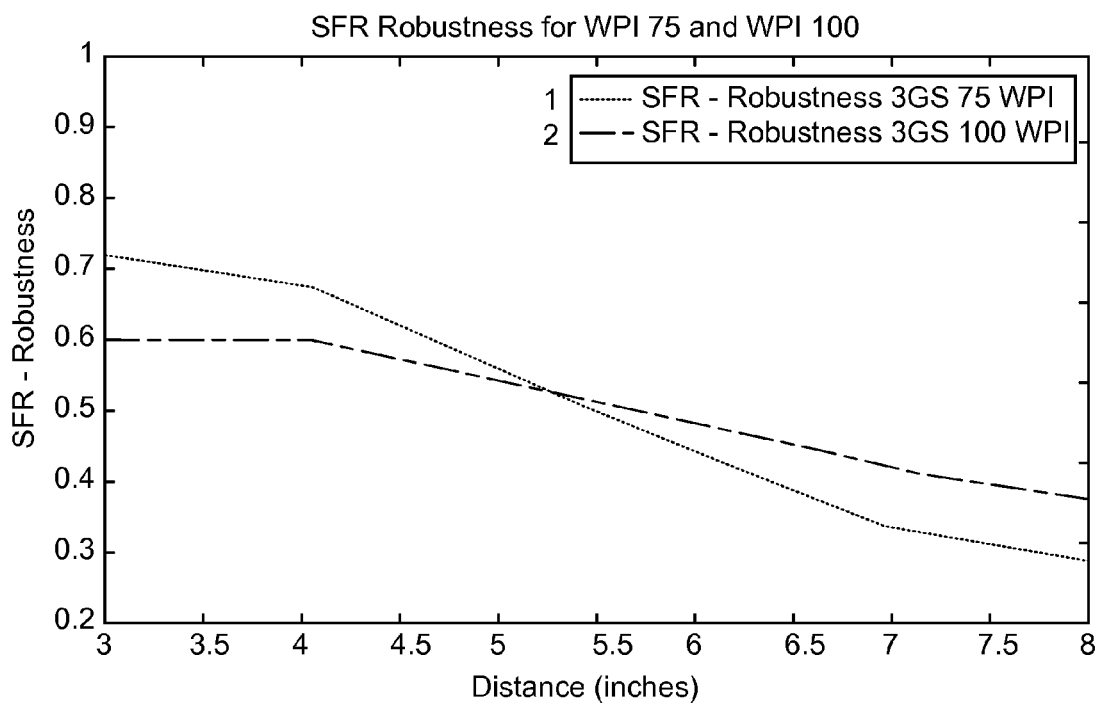
FIG. 5 is a diagram showing watermark robustness predicted by SFR-robustness metric for WPI 75 and 100 as a function of distance.

The watermark detection results of captured images which were watermarked at strength 4 and WPI 100 and 75 are shown in FIG. 4. The "square line" curve is for WPI 75 and the "triangle line" curve is for WPI 100. The detection rate at each distance is the average for 280 image captures. FIG. 5 shows a robustness measurement predicted by the SFR-based robustness metric for WPI 75 and WPI 100 images captured by iPhone 3GS. By comparing FIGS. 4 and 5, it can be observed that the SFR-based robustness metric provides a fairly accurate estimate of the watermark detector performance for different WPI. For example, in FIG. 4, the crossover point of the two curves occurs at a distance of 4.7 inches while the SFR-robustness measurements predict a cross-over point at a distance of 5.2 inches. The SFR-robustness model predicts that watermarking at WPI 100 results in better robustness over shorter target distances (below 5 inches) and watermarking at WPI 75 results in better robustness over longer target distances (greater than 5 inches). This prediction was verified by the actual watermark detector results as shown in FIG. 4. Including a noise model (e.g., associated with a particular color channel) of the capture device may result in an even more accurate robustness model.

Figure 6:
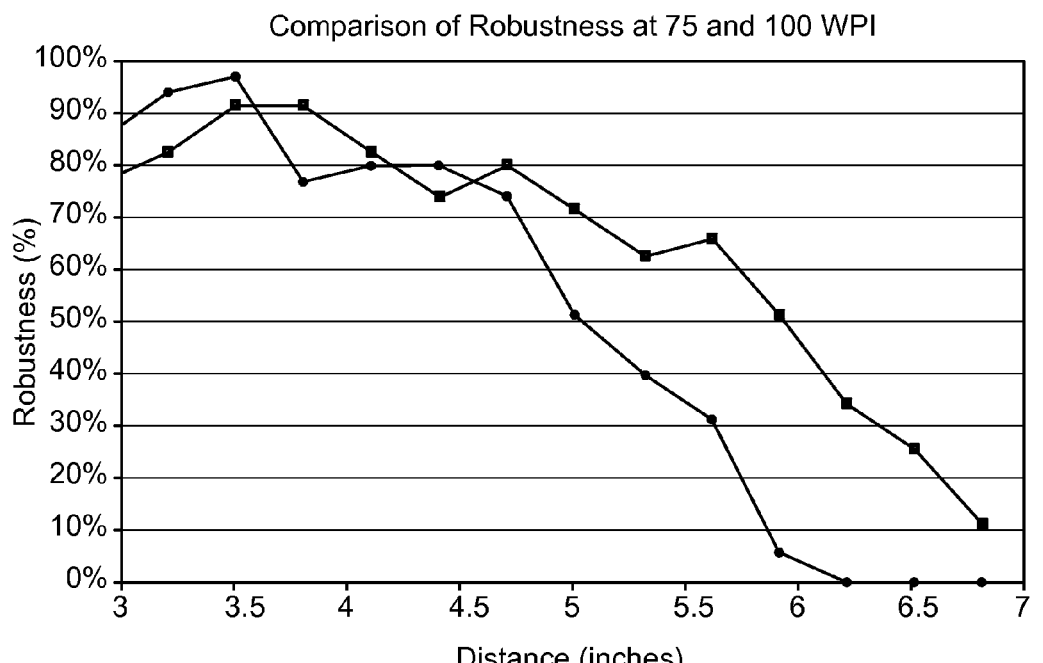
FIG. 6 is a diagram showing average watermark robustness for WPI 75 at strength values of 3 and 4 as a function of distance.

In addition to WPI, watermark robustness model may also include watermark strength information. Images watermarked with different WPI result in watermark detection plots with different slopes and shapes. Images watermarked at the same WPI, but with different strengths, result in watermark detection plots which are scaled versions of each other at least in the near-field (below a distance of 6 inches). The actual watermark detector results for images marked at strengths 3 and 4 at WPI 75 are as plotted in FIG. 6. The SFR-robustness plot at WPI 75 is fitted to watermark detection results for strength 3 and WPI 75 using the empirically determined mapping listed in Table 1.

TABLE 1

Mapping function for normalized SFR-robustness $\lambda_{N,75}$ at WPI 75.

| Distance (inches) d | $\lambda_{N,75}$ at WPI 75, strength 3 |
|---|---|
| d < 4 | $0.75 \times \lambda$ |
| 4 < d > 5 | $0.375 \times \lambda$ |
| 5 < d > 6 | $0.1875 \times \lambda$ |

Figure 7:
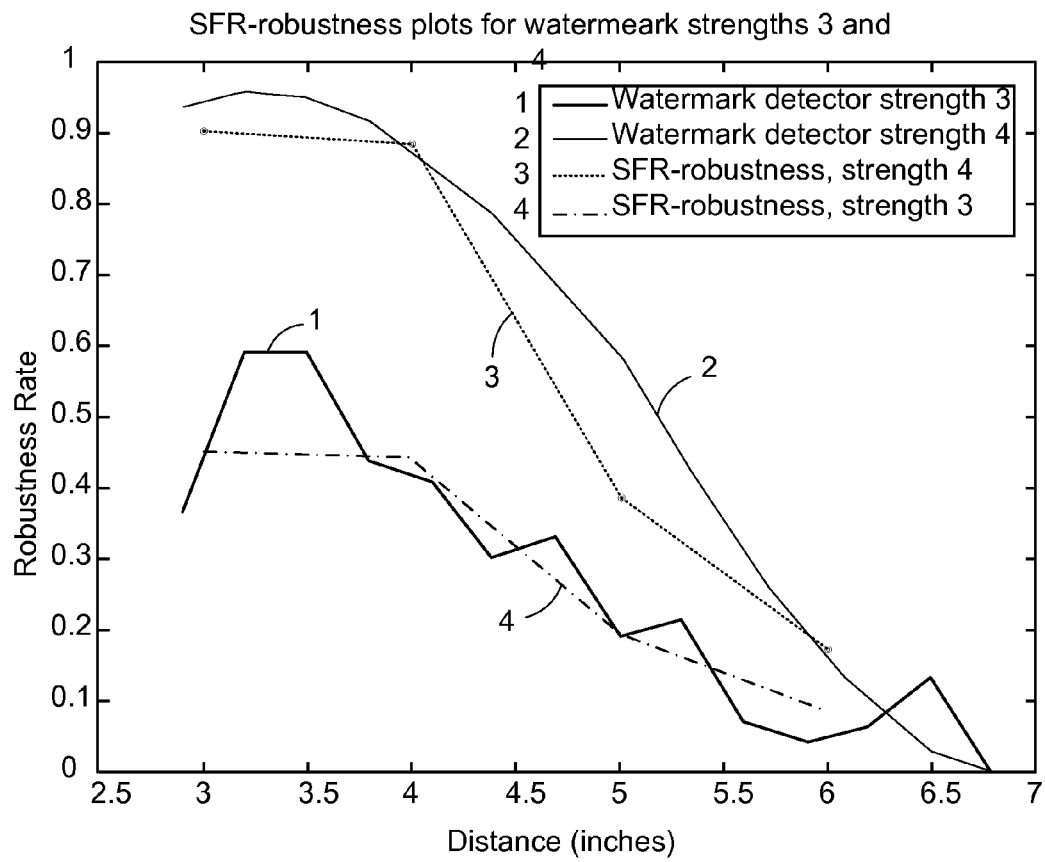
FIG. 7 is a diagram showing robustness of watermark detector and SFR-robustness predictions for WPI 75 at strength values of 3 and 4.

It was found that a unit increase in the strength of the embedded watermark at a given WPI preferably results in scaling the normalized SFR-robustness curves by a constant factor of two. Thus, to account for an increase in the strength from 3 to 4, the normalized SFR-robustness results $\lambda_{N,75}$ are scaled up by a factor of two as shown in FIG. 7.

The SFR-robustness model provides a fast and effective method to evaluate the impact of a given smart phone on the detection of smart images marked using different WPI and strength values. The model can be used to evaluate and compare the impact of various smart phones on watermark detection without having to conduct time-consuming experiments using real images and their captures. Additionally, the SFR-robustness model may provide feedback to a watermarking embedding process about the effect of embedding parameters such as WPI and strength on watermark detection without having to conduct expensive print-runs of images in newspapers and magazines.

SFR-based watermark robustness models and related methods and system have been described for smart phone applications of digital watermarking. The robustness model can be effective in predicting the relative watermark detector performance for different densities or WPI. In one example (e.g., as discussed with FIGS. 4 and 5), the robustness model was able to predict the relative impact of different watermark strength parameters on watermark detection. The SFR-based robustness model provides an effective method to qualify smart phones for use in watermark applications. The SFR-based robustness can provide feedback to the watermark embedding process in finding a reasonable trade-off between visibility and robustness while averting the need for expensive and time-consuming print runs.

Figure 9A:
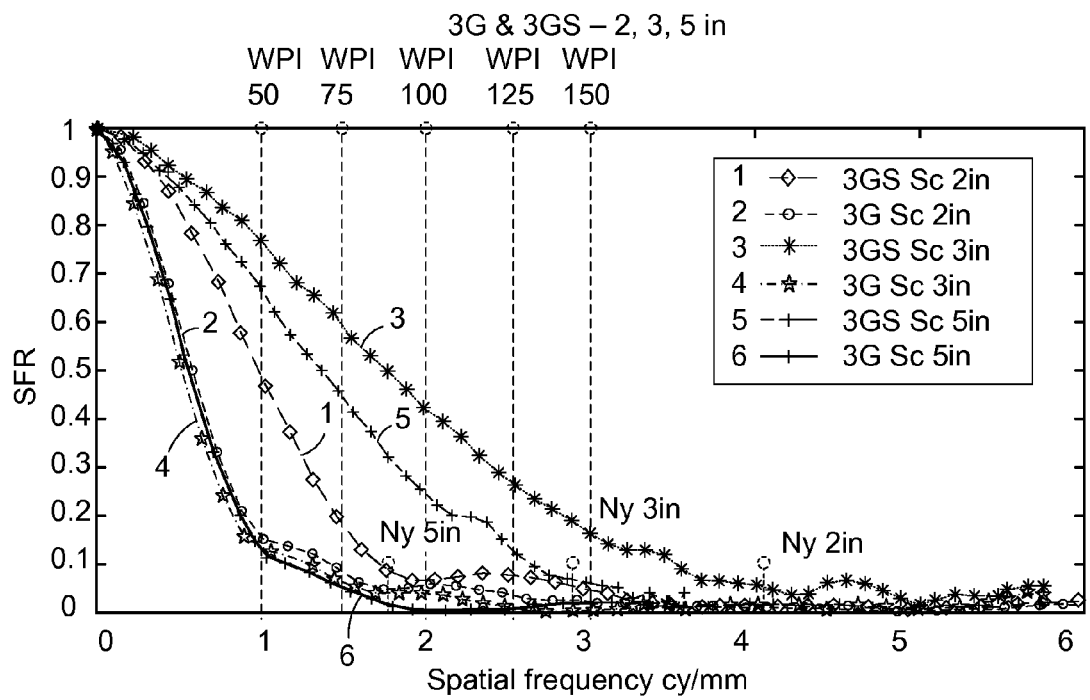
FIGS. 9a and 9b show some SFR characteristics for iPhone 3G, iPhone 3GS, and iPhone 4 at distances 2, 3, and 5 inches from the target smart image. In particular.
Figure 9B:
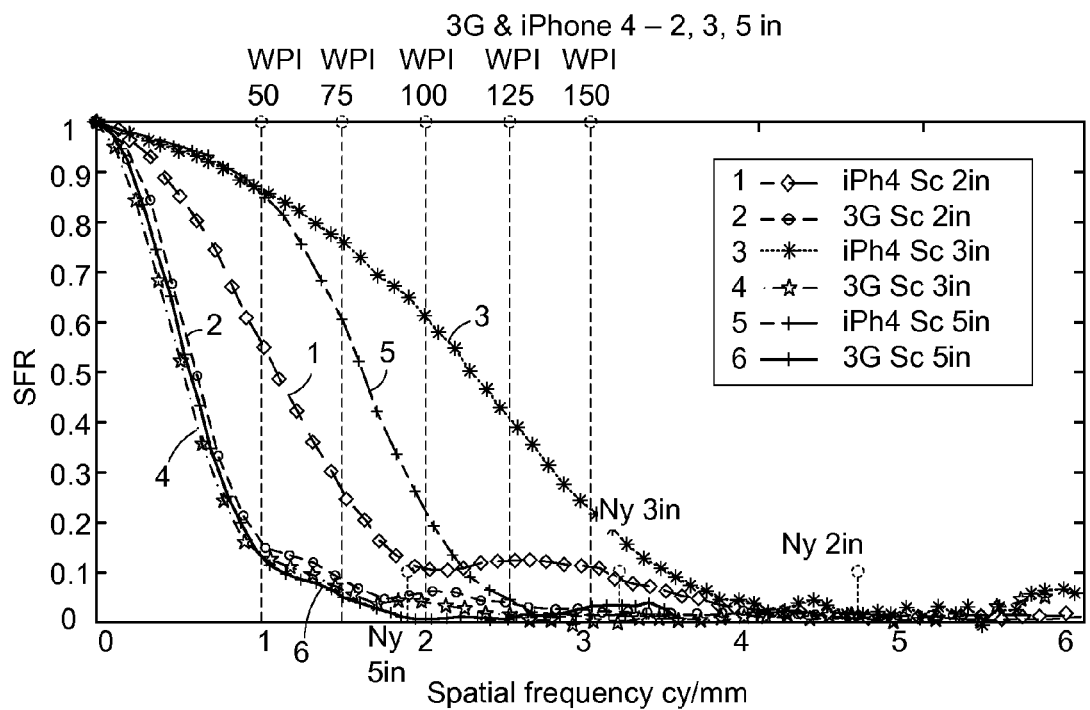

Additional examples are discussed with reference to FIGS. 9-12. The SFR measurements for iPhone 3G and iPhone 3GS cameras at target distances of 2, 3, and 5 inches were obtained as shown in FIGS. 9a & 9b. In FIG. 9a the SFR characteristics of iPhone 4 are indicated by dotted lines and SFR curves of iPhone 3G are indicated by solid lines. In FIG. 9b the SFR characteristics of iPhone 4 are indicated by dotted lines. The SFR of iPhone 3GS is better than that of iPhone 3G at all distances. Due to the fixed focal length of iPhone 3G, the SFR response does not deteriorate rapidly as a function of distance. The SFR curves of the individual red, green and blue channels are usually within a narrow margin around the curve for luminance SFR. For the results in these figures (including FIGS. 9a & 9b) only the luminance channel is used for representing the SFR of a particular capture device.

In FIGS. 9a & 9b the vertical dotted lines indicate the Nyquist frequency of the image captured at different distances. The Nyquist frequency can be determined by the resolution of preview capture at a given distance. For example, preview frames captured at a distance of 3 inches were measured to have a resolution of 150 PPI, preview frames captured at 5 inches had a resolution of 90 PPI, and preview frames at 7 inches had a resolution of 64 PPI. Any image content including spatial frequencies above the sampling frequency can be aliased in accordance with a scaling factor determined by the SFR. The aliased content interferes with the image content at lower spatial frequencies. The dotted lines in FIGS. 9a and 9B show various WPI options available during the watermark embedding process. For example, 100 WPI corresponds to 50 cycles per inch. In this example, and for a printed image watermarked at a resolution of 100 WPI, the synchronization signal can be present in the spatial frequencies ranging from 12.5 cycles per inch to 37.5 cycles per inch. Hence, by projecting the WPI onto the SFR characteristics, the SFR of a capture device is obtained for the spatial frequencies spanned by the synchronization signal.

In order to verify the robustness model based on the SFR-robustness metric, several experiments were conducted using actual smart images. The watermark detection results presented in this section are based on images captured using iPhone 3GS and iPhone 4. Due to the post-processing operations inherent in the watermark detector, the actual watermark robustness results at higher strength values tend to saturate to 100% detection rate after sufficient watermark signal is present in the camera-captured smart images. As a result, for facilitating comparison with SFR-robustness metric, Gaussian noise may be added to the captured images which were watermarked at higher strength values.

With reference to FIGS. 11-14, a set of four (4) standard newspaper print images with diverse content was used. The images were watermarked with different watermark strength values (3 and 4) and WPI (75 and 100) resulting in multiple sets of watermarked images. The iPhone 3GS was used to capture the preview frames of each watermarked image over a range of distances of 3 inches to 7 inches in the presence of cool white fluorescent illumination at a light level of 50 lux. The light level was selected to be at the lowest value in common use in an office or home environment. For each of the 4 prints a set of 35 preview images were captured at each position, separated by 0.3 inches from 2.9 inches to 7.1 inches. The captured images were then input to the watermark detector. Thus each point on the actual watermark robustness curve (for example, see FIG. 11) represents the average of 280 image captures. The captures were degraded by Gaussian noise with a standard deviation of 20% before watermark reading to avoid saturation of the robustness at low distances.

Figure 11:
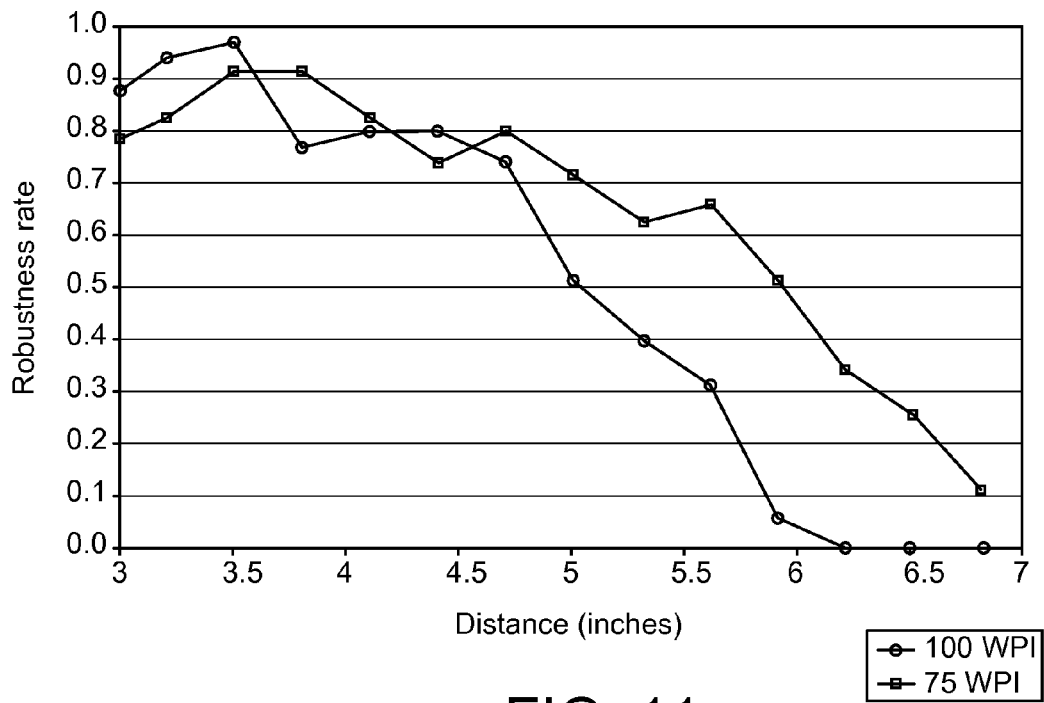
FIG. 11 shows average watermark robustness for WPI 75 and 100 as a function of distance.
Figure 12:
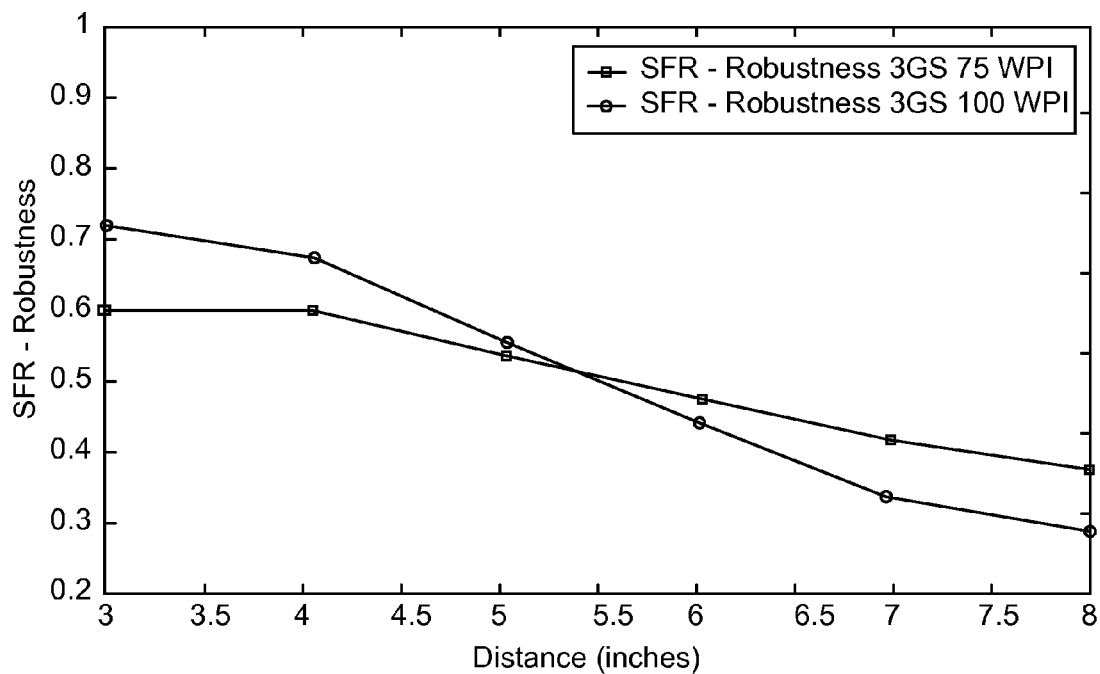
FIG. 12 shows watermark robustness predicted by SFR-robustness metric for WPI 75 and 100 as a function of distance.
Figure 13:
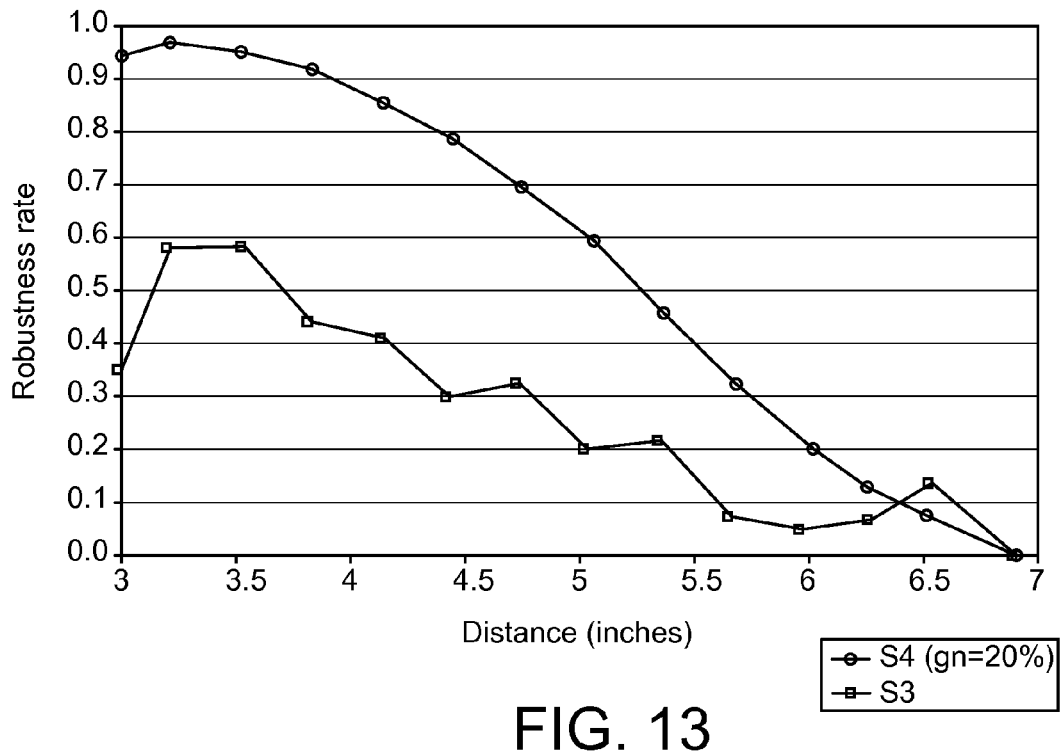
FIG. 13 shows average watermark robustness for WPI 75 at strength values of 3 and 4 as a function of distance.

The watermark detection results of captured images which were watermarked at strength 4 and WPI 100 and 75 (square markers) are shown in FIG. 11. The detection rate at each distance is the average for 280 image captures. FIG. 12 shows the robustness measurement predicted by the SFR-based robustness metric for WPI 75 and WPI 100 images captured by iPhone 3GS. By comparing FIGS. 11 and 12, it can be observed that the SFR-based robustness metric provides a fairly accurate estimate of the watermark detector performance for different WPI. For example, in FIG. 11, the cross-over point of the two curves occurs at a distance of 4.7 inches while the SFR-robustness measurements predict a cross-over point at a distance of 5.2 inches. The SFR-robustness model predicts that watermarking at WPI 100 results in better robustness over shorter target distances (below 5 inches) and watermarking at WPI 75 results in better robustness over longer target distances (greater than 5 inches). This prediction was verified by the actual watermark detector results as shown in FIG. 11.

In addition to WPI, the watermark robustness model can also include strength information. Images watermarked with different WPI may result in watermark detection plots with different slopes and shapes. Images watermarked at the same WPI but different strengths may result in watermark detection plots which are scaled versions of each other. The iPhone 3GS watermark detector results for images marked at WPI 75 and strength values of 3 and 4 are plotted in FIG. 13. The SFR-robustness data for WPI 75 (shown earlier in FIG. 11) was interpolated using a 4th order polynomial to collect data at intermediate distances ranging from 2.9 inches to 6.8 inches, in increments of 0.3 inches. The resulting interpolated SFR-robustness data was plotted against watermark robustness data for strengths 3 and 4 at WPI 75 in FIG. 14.

Figure 14:
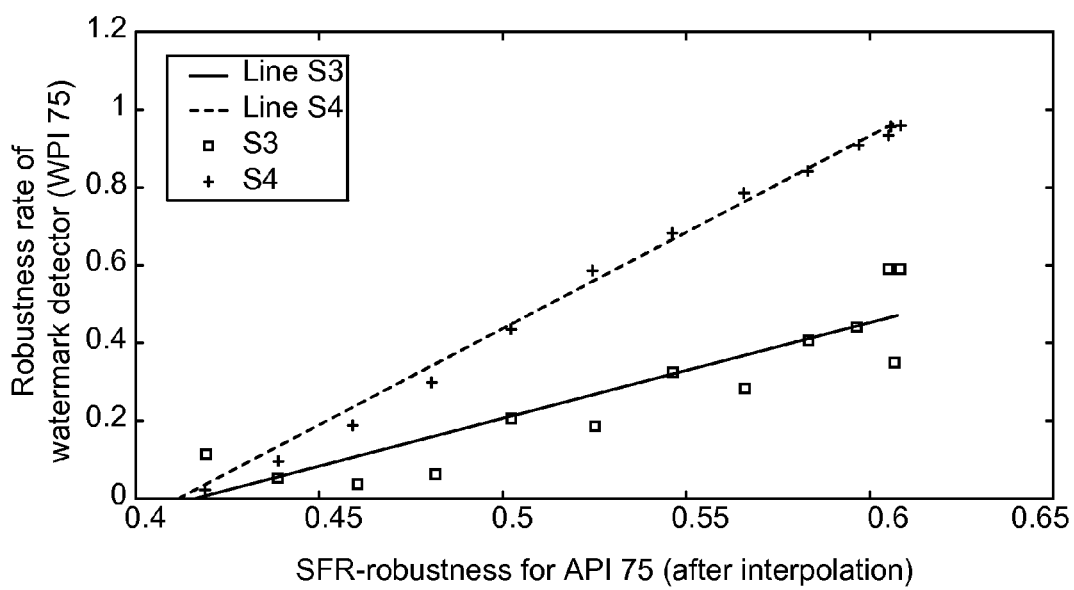
FIG. 14 shows a comparison of SFR-robustness (interpolated) with watermark robustness at strength values of 3 and 4 (all for WPI 75).

The lines in FIG. 14 are the result of least squares fitting of the data for strengths 3 and 4. The linear least squares solutions ($y_{S3}$ and $y_{S4}$) for strength 3 and strength 4 data are governed by the following equations:

$$y_{S3} = 2.4499\lambda - 1.0166 \quad (2)$$

$$y_{S4} = 4.959\lambda - 2.0409 \quad (3)$$

The mean squared error (MSE) between $y_{S4}$ and watermark robustness data for strength 4 is $6.77 \times 10^{-4}$. The MSE for $y_{S3}$ and watermark detector results for strength 3 is 0.0057. The $y_{S3}$ data is associated with a higher MSE because the watermark robustness results were based on fewer (35 compared to 280) image captures. Due to the linear relationship between the SFR-robustness data and watermark detector results at different strength values, a constant scale factor can account for watermark strength variations in the SFR-robustness results that are not saturated.

Figure 15A:
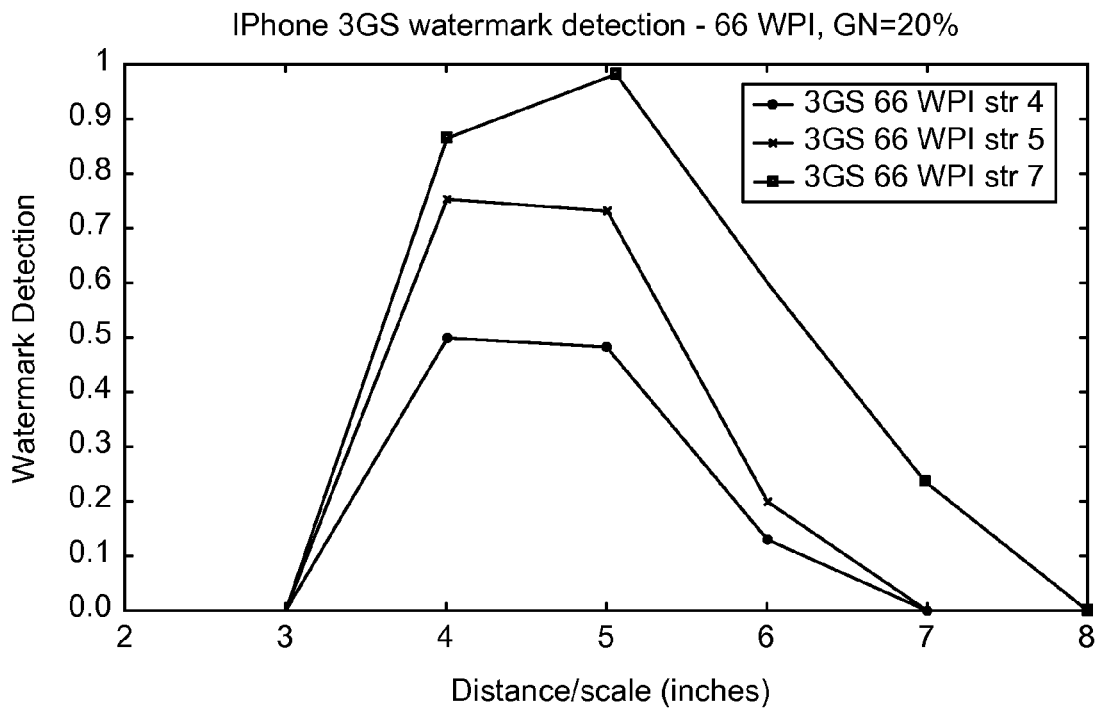
FIGS. 15a-15d show comparisons of iPhone 3GS and iPhone watermark robustness for WPI 66 and strength values of 4, 5, and 7 with varying amounts of Gaussian noise. In particular.
Figure 15B:
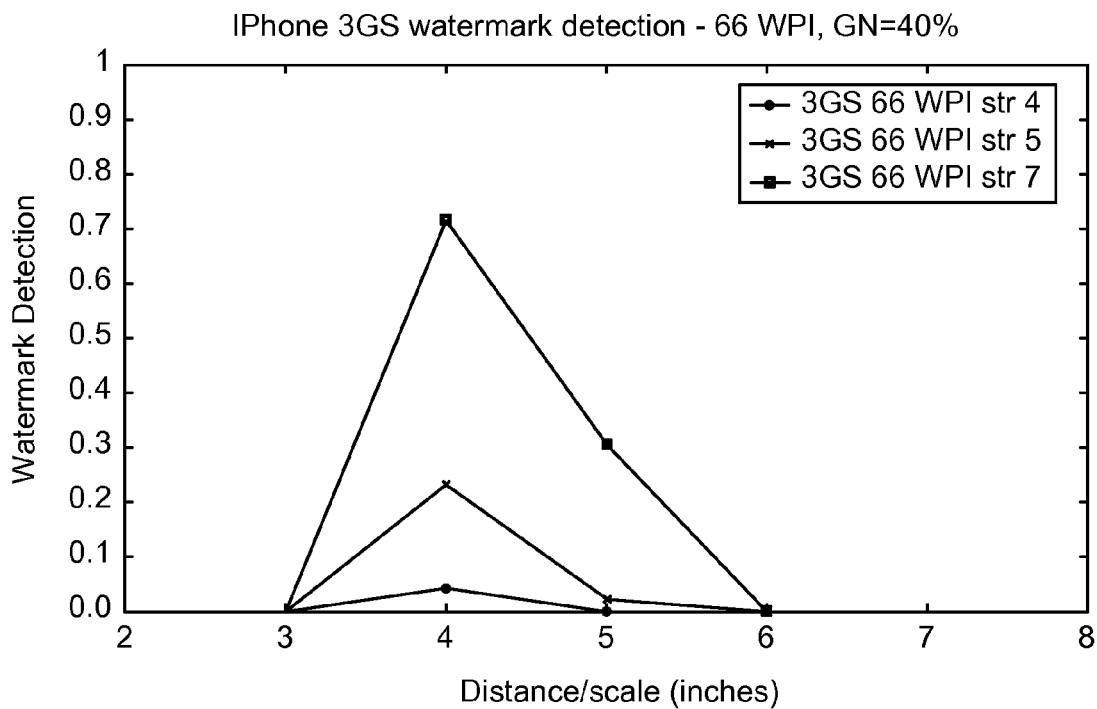
Figure 15C:
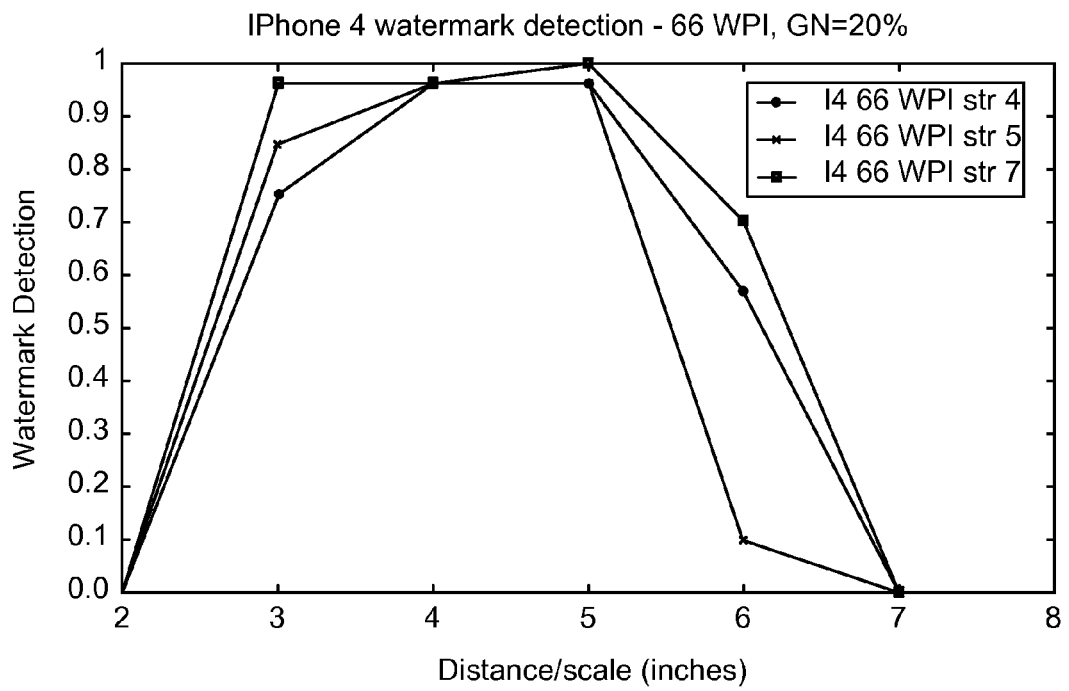
Figure 15D:
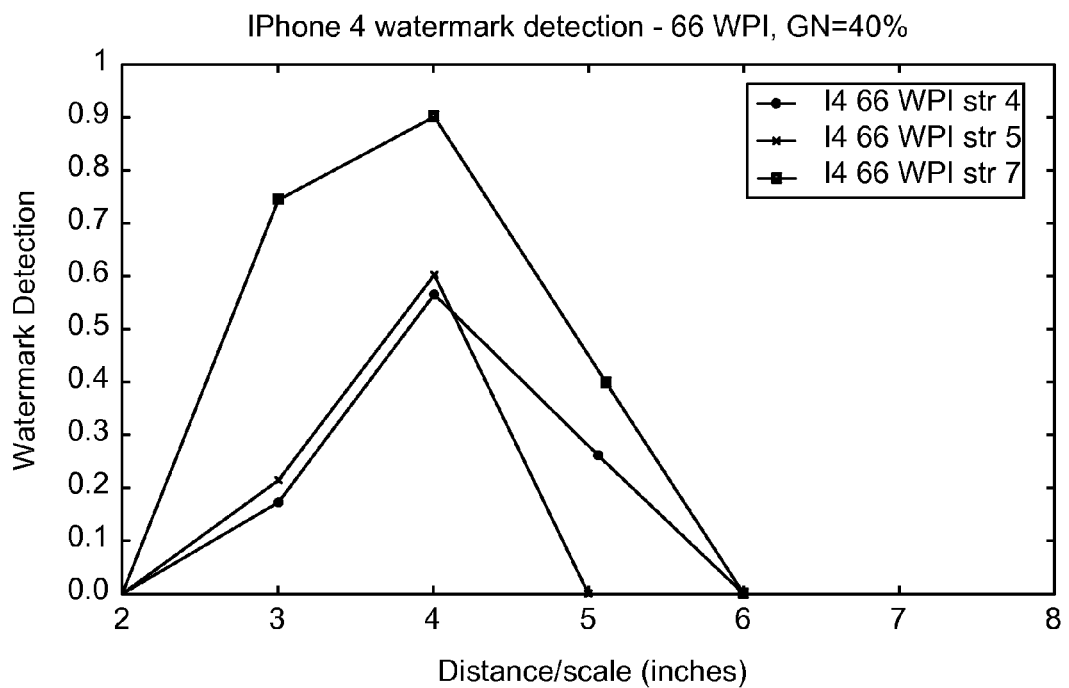

With reference to FIGS. 15a-16b, the above same set of 4 newspaper print images was used. However, only 20 captures of the smart images were obtained for each data point in the results. Moreover, the captures were only obtained at integer increments of scale values (distance of the camera from the target). As a consequence the data presented in these figures is characterized by more abrupt changes. FIG. 8 shows the impact of different watermark strength values on watermark robustness for a given phone and a given WPI. As indicated in FIG. 8, varying amounts of Gaussian noise were added to the captured images before passing them to the watermark detector in order to avoid saturation. The watermark robustness for iPhone 3GS images at strength values of 4, 5, and 7 for Gaussian noise of 20% and 40% are shown in FIGS. 15a and 15b, respectively. The watermark robustness for iPhone 4 images at the same strength values for Gaussian noise of 20% and 40% are shown in FIGS. 15c and 15d. With reference to these figures, a higher embedded watermark strength value results in improved watermark robustness at the detector. The robustness results of FIG. 15 indicate that the robustness plots for a given phone are scaled version of each other at different strength values if the WPI is fixed. This confirms the above discussion pertaining to the linear relationship between SFR-robustness data and watermark robustness results at different strength values (refer to FIG. 14).

Figure 16A:
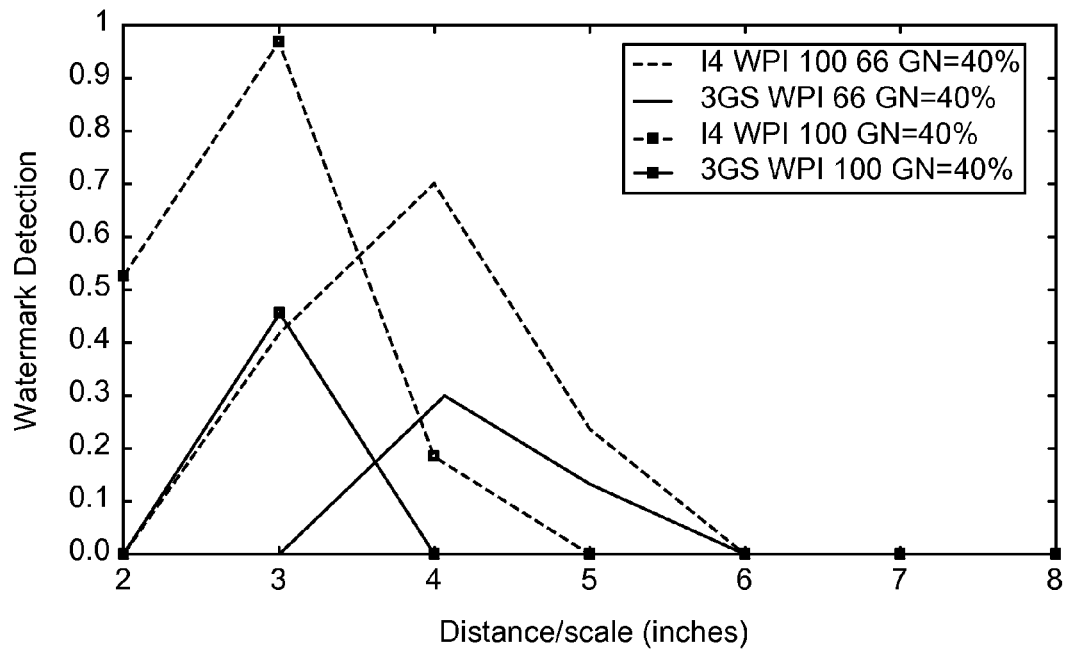
FIGS. 16a-16b show a comparison of watermark robustness results and SFR-robustness for iPhone 3GS and iPhone 4 at WPI 66 and WPI 100. In particular.
Figure 16B:
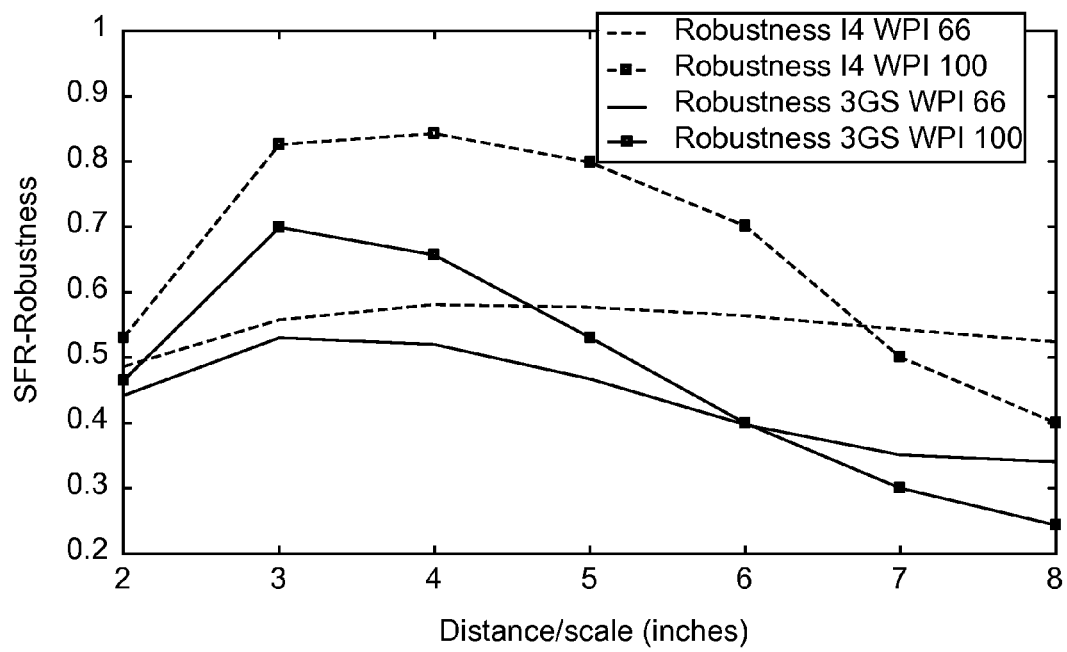

Please refer to FIGS. 15 and 16 for watermark robustness results at WPI 66 and WPI 100 for iPhone 3GS and iPhone 4. Gaussian noise was added to avoid saturation of the robustness values. These results are plotted in FIG. 16a. The SFR-robustness plots are shown in FIG. 16b for WPI 66 and 100 and for values of scale ranging from 2 inches to 8 inches. The watermark robustness of iPhone 4 at WPI 100 is better than the robustness of iPhone 4 at WPI 66 for smaller values of scale. Similarly, for smaller scale values, the watermark robustness of iPhone 3GS at WPI 100 appears better that the robustness of iPhone 3GS at WPI 66. For a given WPI (66 or 100), images captured by iPhone 4 demonstrate superior robustness performance compared to the images captured by iPhone 3GS. By comparing FIGS. 15a and 15b it is apparent that SFR-robustness metric (FIG. 15b) is a good indicator of watermark robustness for different embedding parameters (e.g., WPI) and camera phones.

The SFR-robustness model provides a fast and effective method to evaluate the impact of a given smart phone on the detection of smart images marked using different WPI (e.g., watermark density) and strength values. The model can be used to evaluate and compare the impact of various smart phones on watermark detection without having to conduct time-consuming experiments using real images and their captures. Additionally, the SFR-robustness model provides feedback to the watermarking embedding process about the effect of embedding parameters such as WPI and strength on watermark detection without having to conduct expensive print-runs of images in newspapers and magazines.

The computing environments used to implement the above processes and system components encompass a broad range from general purpose, programmable computing devices to specialized circuitry, and devices including a combination of both. The processes and system components may be implemented as instructions for computing devices, including general purpose processor instructions for a variety of programmable processors, including microprocessors, Digital Signal Processors, etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processors and/or made parallel across processors within a device or across a network of devices. Transformation of content signal data may also be distributed among different processor and memory devices.

The computing devices used for signal detection and embedding may include, e.g., one or more processors, one or more memories (including computer readable media), input devices, output devices, and communication among these components (in some cases referred to as a bus). For software/firmware, instructions are read from computer readable media, such as optical, electronic or magnetic storage media via a communication bus, interface circuit or network and executed on one or more processors.

The above processing of content signals may include transforming of these signals in various physical forms. Images and video (forms of electromagnetic waves traveling through physical space and depicting physical objects) may be captured from physical objects using cameras or other capture equipment, or be generated by a computing device. While these signals are typically processed in electronic and digital form to implement the components and processes described above, they may also be captured, processed, transferred and stored in other physical forms, including electronic, optical, magnetic and electromagnetic wave forms. The content signals can be transformed during processing to compute signatures, including various data structure representations of the signatures as explained above. In turn, the data structure signals in memory can be transformed for manipulation during searching, sorting, reading, writing and retrieval. The signals can be also transformed for capture, transfer, storage, and output via display or audio transducer (e.g., speakers).

While reference has been made to cell phones and smart mobile devices, it will be recognized that this technology finds utility with all manner of devices—both portable and fixed. PDAs, organizers, portable music players, tablets, pads, desktop computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones.

(Early details of the iPhone, including its touch interface, are provided, e.g., in published patent application 20080174570.)

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc). An exemplary cell phone that can be used to practice part or all of the detailed arrangements is shown in FIG. 1, discussed above.

The processor can be a special purpose electronic hardware device, or may be implemented by a programmable electronic device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more electronic digital signal processing cores, such as Texas Instruments TMS320 series devices.

Software instructions for implementing the detailed functionality can be readily authored by artisans, from the descriptions provided herein, conclusions, and other determinations noted above.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.)

In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.) For example, a cell phone may distribute some or all of the image data and/or lighting information to the cloud for analysis, e.g., to detect an encoded signal or to determine image statistics. A detection result, a partial result or computation stages may be communicated back to the cell phone for review or further computation or actions.

Concluding Remarks

Having described and illustrated the principles of the technology with reference to specific implementations, it will be recognized that the technology can be implemented in many other, different, forms. To provide a comprehensive disclosure without unduly lengthening the specification, each of the above referenced patent documents is hereby incorporated by reference in its entirety.

The particular combinations of elements and features in the above-detailed embodiments are exemplary only; the interchanging and substitution of these teachings with other teachings in this and the incorporated-by-reference patent documents are also contemplated.

What is claimed is:

1. A method comprising:

measuring a spatial frequency response (SFR) of a cell phone camera;

calculating a measure associated with the SFR using one or more programmed electronic processors; and using the one or more programmed electronic processors, altering a digital watermark embedding process based on the measure, in which the measure is calculated by computing an area under a SFR curve for the range of spatial frequencies associated with a digital watermark component and subtracting an area under the SFR curve due to aliasing.

2. The method of claim 1 in which the area under the SFR curve associated with the digital watermark component is computed using a trapezoidal rule over intervals of spatial frequencies.

3. A method comprising:

measuring a spatial frequency response (SFR) of a cell phone camera;

calculating a measure associated with the SFR using one or more processors; and using the one or more processors, altering a digital watermark embedding process based on the measure, in which the measure is calculated as follows:

$$\lambda = \rho_{synch} - \rho_{alias},$$

where $\rho_{synch}$ is an area under a SFR curve in the region of an associated digital watermark component, and $\rho_{alias}$ is an area under the SFR curve due to spatial frequencies aliasing with the digital watermark component.

4. The method of claim 3 in which the area under the SFR curve associated with the digital watermark component is computed using a trapezoidal rule over intervals of spatial frequencies.

5. An apparatus comprising:

memory; and one or more electronic processors programmed for:

measuring a spatial frequency response (SFR) of a cell phone camera;

calculating a measure associated with the SFR by computing an area under a SFR curve for a range of spatial frequencies associated with a digital watermark component and subtracting an area under the SFR curve due to aliasing; and altering a digital watermark embedding process based on the measure.

6. The apparatus of claim 5 in which the area under the SFR curve associated with the digital watermark component is computed using a trapezoidal rule over intervals of spatial frequencies.

7. An apparatus comprising:

memory; and one or more electronic processors programmed for:

measuring a spatial frequency response (SFR) of a cell phone camera;

calculating a measure associated with the SFR as follows:

$$\lambda = \rho_{synch} - \rho_{alias},$$

where $\rho_{synch}$ is an area under a SFR curve in a region of an associated digital watermark component, and $\rho_{alias}$ is an area under the SFR curve due to spatial frequencies aliasing with the digital watermark component; and altering a digital watermark embedding process based on the measure.

8. The apparatus of claim 7 in which the area under the SFR curve associated with the digital watermark component is computed using a trapezoidal rule over small intervals of spatial frequencies.

* * * * *

UNITED STATES PATENT AND TRADEMARK OFFICE
CERTIFICATE OF CORRECTION

PATENT NO. : 8,923,546 B2
APPLICATION NO. : 13/176242
DATED : December 30, 2014
INVENTOR(S) : Aparna R. Gurijala and Alastair M. Reed It is certified that error appears in the above-identified patent and that said Letters Patent is hereby corrected as shown below:

Please change the first inventor named on the title page of the patent from:

item "(12) United States Patent
        Reed" to item --(12) United States Patent
        Gurijala et al.--.

Please change the Inventor (75) on the title page of the patent from:

"(75) Inventor: Alastair M. Reed, Lake Oswego, OR (US)" to

--(75) Inventors: Aparna R. Gurijala, Portland, OR (US); Alastair M. Reed, Lake Oswego,
        OR (US)--.

Signed and Sealed this
Twenty-sixth Day of July, 2016

Michelle K. Lee
*Director of the United States Patent and Trademark Office*